United States Patent
Shirakabe et al.

(10) Patent No.: US 8,379,577 B2
(45) Date of Patent: Feb. 19, 2013

(54) WIRELESS RESOURCE ASSIGNING APPARATUS AND WIRELESS RESOURCE ASSIGNING METHOD

(75) Inventors: Masashige Shirakabe, Yokohama (JP); Naoto Matoba, Fujisawa (JP); Takatoshi Sugiyama, Yokohama (JP); Hitoshi Yoshino, Yokosuka (JP); Tatsuro Masamura, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 1626 days.

(21) Appl. No.: 11/360,686

(22) Filed: Feb. 24, 2006

(65) Prior Publication Data
US 2006/0203723 A1 Sep. 14, 2006

(30) Foreign Application Priority Data
Feb. 24, 2005 (JP) ................. 2005-049415

(51) Int. Cl.
- H04W 4/00 (2009.01)
- H04L 12/28 (2006.01)
- H04W 72/00 (2009.01)

(52) U.S. Cl. ............. 370/329; 370/395.21; 370/395.4; 370/395.42; 455/450

(58) Field of Classification Search ........... 370/236.1, 370/395.21, 329
See application file for complete search history.

(56) References Cited

U.S. PATENT DOCUMENTS

| | | | |
|---|---|---|---|
| 2002/0176380 A1* | 11/2002 | Holtzman et al. | 370/329 |
| 2002/0183084 A1* | 12/2002 | Wu et al. | 455/509 |
| 2003/0223451 A1 | 12/2003 | Bi et al. | |
| 2006/0026052 A1* | 2/2006 | Klett et al. | 705/8 |

FOREIGN PATENT DOCUMENTS

| | | |
|---|---|---|
| CN | 1568032 A | 1/2005 |
| JP | 2003-70055 | 3/2003 |
| JP | 2003-152679 | 5/2003 |
| WO | WO 2006/075372 A1 | 7/2006 |

OTHER PUBLICATIONS

Robert F. H. Fischer, et al., "A New Loading Algorithm for discrete Multitone Transmission", Proc. IEEE GLOBECOM 1996, vol. 1, 1996, pp. 724-728.

(Continued)

Primary Examiner — Huy C Ho
(74) Attorney, Agent, or Firm — Oblon, Spivak, McClelland, Maier & Neustadt, L.L.P.

(57) ABSTRACT

A wireless resource assigning apparatus for assigning wireless resources to transmission data of a plurality of users is disclosed. The wireless resource assigning apparatus includes a scheduling part configured to start scheduling for all users from a first wireless resource among a plurality of wireless resources prioritized according to a predetermined criterion, and repeat scheduling up to the last wireless resource for users except for users to whom any wireless resource has been assigned.

11 Claims, 11 Drawing Sheets

OTHER PUBLICATIONS

Tomoaki Yoshiki, et al., "High Bit Rate Transmission Scheme with a Multilevel Transmit Power Control for the OFDM based Adaptive Modulation Systems", IEEE, VTC2001 Spring, pp. 727-731.

Yoshiaki Ofuji, et al., "Fast Packet Scheduling Algorithm Based on Instantaneous SIR with Constraint Condition Assuring Minimum Throughput in Forward Link", IEEE WCNC 2003, pp. 860-865.

Tomoaki Yoshiki, et al., "OFDM Based Adaptive Modulation Systems with a Multilevel Transmit Power Control for High Bit Rate Transmission", Transactions of IEICE, vol. J84B, No. 7, Jul. 2001, pp. 1141-1150 (Japanese document corresponding to document AV).

Yoshiaki Ofuji, et al., "Fast Packet Scheduling Algorithm Based on Instantaneous SIR with Constraint Condition Assuring Minimum Throughput", Technical Report of IEICE, RCS2002-75, Jun. 2002, pp. 1-6 (Japanese document corresponding to document AW).

Liang Xiao, et al., "A Dynamic Resource Scheduling Algorithm for OFDM System", Communications, $9^{th}$ Asia-Pacific Conference, XP-010688224, vol. 2, Sep. 21, 2003, pp. 444-447.

Guocong Song, et al., "Joint Channel-Aware and Queue-Aware Data Scheduling in Multiple Shared Wireless Channels", Wireless Communications and Networking Conference, 2004 IEEE, XP-010708069, vol. 3, Mar. 21, 2004, pp. 1939-1944.

* cited by examiner

FIG.10

| Frequency Band | 800MHz / 2GHz | | Fading | 6 Path Rayleigh |
|---|---|---|---|---|
| Bandwidth | 5 MHz | | Path Loss Factor | 4 |
| Number of Subcarriers | 64 | | Velocity | 20 km/h (for calculating Doppler frequency) |
| Numuber of FFT Points | 64 | | Shadowing | Log-normal distribution ($\sigma = 8$dB) |
| OFDM Frame Length | 8 symbols (0.128 msec) | | Frequency Reuse | 7 |
| Guard Interval | 16 samples (3.2 μsec) | | Number of Interference Cells | 6 |
| Modulation (Coding Rate) | QPSK ( R = 1/2, 3/4 ) 16QAM ( R = 1/2, 3/4 ) | | Cell Radius | 1 km |
| Coding / Decoding | Convolutional Coding Viterbi Decoding (Soft Dicision) | | Transmit Power | 1 W |
| Constraint Length | K = 5 | | Scheduling Block | 4 Subcarriers, 8 Symblos |

WIRELESS RESOURCE ASSIGNING APPARATUS AND WIRELESS RESOURCE ASSIGNING METHOD

BACKGROUND OF THE INVENTION

1. Field of the Invention

The present invention relates to a wireless resource assigning apparatus and a wireless resource assigning method for assigning wireless resources efficiently when users can use multiple wireless resources that can be used for wireless communications.

2. Description of the Related Art

Algorithms for enhancing frequency efficiency in a single frequency band have been studied from the past. As an algorithm for power assignment for a single user, a transmit power control method is proposed for assigning large power to a sub-carrier in a good channel state and assigning small power to a sub-carrier in a bad channel state (refer to non-patent document 1, for example). In addition, a scheme is proposed for largely enhancing throughput by combining this technology with another technology such as adaptive modulation and coding, and the like (refer to non patent document 2, for example).

On the other hand, a multi-user scheduling algorithm is proposed (refer to non patent document 3, for example). The RR (Round Robin) method is a scheduling algorithm for assigning resources fairly. According to this method, although fairness can be kept, SINR (Signal to Interference and Noise power Ratio) is not considered. Thus, compared with a scheme considering SINR, the system throughput is low. The Max. CIR (Maximum Carrier to Interference power Ratio) method is an algorithm for maximizing the system throughput by assigning the radio resource to a user who has the maximum SINR. In this scheme, since the communication opportunity is not given to a user having low SINR, there is a problem that fairness cannot be kept. The PF (Proportional Fairness) method is an algorithm for assigning the radio resources to a user who has the maximum instantaneous SINR normalized by an average SINR of the user in order to keep fairness among users. Thus, the system throughput can be improved compared with the RR method while keeping fairness.

[Non-patent document 1] R. F. H. Fischer and J. B. Huber, "A New Loading Algorithm for Discrete Multitone Transmission", Proc. IEEE GLOBECOM 1996, Vol. 1 pp. 724-728, 1996;

[Non-patent document 2] T. Yoshiki, S. Sampei, N. Morinaga, "High bit rate transmission scheme with a multilevel transmit power control for the OFDM based adaptive modulation systems", TRANSACTIONS OF IEICE, Vol. J84B, July 2001;

[Non-patent document 3] Y. Ofuji, S. Abeta, M. Sawahashi, "Fast packet scheduling algorithm based on instantaneous SIR with constraint condition assuring minimum throughput in forward link", TECHNICAL REPORT OF IEICE, RCS2002-75, pp. 1-6, June 2002.

Aforementioned algorithms exist as conventional multi-user scheduling algorithms. But, they are assumed to be used in a single wireless resource, and algorithms for multiple wireless resources are not considered. Thus, there is a problem that an effect of scheduling cannot be obtained when multiple wireless resources are targeted.

FIG. 1 shows a conventional method for assigning wireless resources. Since the target for multi-user scheduling is limited to a single wireless resource, a part of users that are targets are specified (roughly assigned) after selecting wireless resources in step S10. Next, multi-user scheduling is performed for each wireless resource independently (steps S11-S1N).

It is generally known that the larger the number of users is, the higher the effect of scheduling of the conventional multi-user scheduling is. However, as mentioned above, since multi-user scheduling is performed after a part of users are assigned to each wireless resource, the number of users using the wireless resource becomes small, so that the effect of the scheduling is decreased. Therefore, it becomes difficult to perform wireless resource assignment that follows channel state and interference amount in multiple wireless resources.

SUMMARY OF THE INVENTION

The present invention is contrived in view of the above-mentioned conventional problem, and an object of the present invention is to provide a wireless resource assigning apparatus and a wireless resource assigning method that can efficiently perform multi-user scheduling over multiple wireless resources and that can perform wireless resource assignment following channel state and interference amount.

The object is achieved by a wireless resource assigning apparatus for assigning wireless resources to transmission data of a plurality of users, including:

a scheduling part configured to start scheduling for all users from a first wireless resource among multiple wireless resources prioritized according to a predetermined criterion, and repeat scheduling in order up to the last wireless resource for users to whom wireless resources are not assigned.

Namely, multi-user scheduling is performed in order from the first resource. A user to whom the wireless resource is assigned uses the wireless resource, and multi-user scheduling is performed in a wireless resource of a next priority for users to whom the wireless resource is not assigned. Accordingly, since scheduling is performed for all users for the first wireless resource, the frequency efficiency by using scheduling becomes high. Also as to other wireless resources, the frequency efficiency by using scheduling is high compared with the frequency efficiency by using the conventional scheme in which wireless resources are assigned first.

The object is also achieved by a wireless resource assigning apparatus for assigning wireless resources to transmission data of multiple users, including:

a scheduling start wireless resource selection part configured to determine a wireless resource from which scheduling is started for each user using at least one of QoS of the user, usable frequency information, and instantaneous receive quality information;

a scheduling part configured to start scheduling, from a first wireless resource among multiple wireless resources prioritized according to a predetermined criterion, for users for whom a scheduling start wireless resource is the first wireless resource, and repeat scheduling in order up to the last wireless resource for users to whom no resource has been assigned up to previous scheduling and for users for whom a targeted wireless resource in the repetition corresponds to the predetermined scheduling start wireless resource.

According to this configuration, more efficient scheduling can be performed considering status of users.

In the wireless resource assigning apparatus, after the scheduling for the last wireless resource ends, scheduling processing may return to the first wireless resource, so that scheduling is repeated for users to whom no resource has been assigned in previous scheduling. Accordingly, when there exists an available wireless resource, wireless resource assignment can be performed efficiently.

The wireless resource assigning apparatus may include a priority setting part configured to set priorities to the multiple wireless resources so as to number the wireless resources in order of the priorities. By providing the priority setting part, assignment can be performed from a high priority wireless resource, so that improvement of system throughput can be achieved.

In the wireless resource assigning apparatus, the priority setting part may determine the priorities of the wireless resources adaptively according to wireless parameters and QoS of users. Thus, a proper priority can be determined according to circumstances.

The wireless resource assigning apparatus may include a scheduling criterion determination part configured to determine a scheduling criterion applied to each wireless resource. By providing the scheduling criterion determination part, proper scheduling can be performed according to wireless resources.

The scheduling criterion determination part may determine the scheduling criterion adaptively according to wireless parameters and QoS of users. Therefore, proper scheduling can be performed according to circumstances.

Also, the scheduling criterion determination part may determine a scheduling scheme for each wireless resource using at least one of user QoS information, usable frequency information, and instantaneous receive quality information. Therefore, proper scheduling can be performed according to circumstances.

In addition, the present invention can be also configured as a wireless resource assigning method for assigning wireless resources to transmission data of users, including:

a step of starting scheduling for all users from a first wireless resource among multiple wireless resources prioritized according to a predetermined criterion;

a step of repeating scheduling in order up to the last wireless resource for users except for users to whom any wireless resource has been assigned.

In addition, the present invention can be also configured as a wireless resource assigning method for assigning wireless resources to transmission data of users, including:

a step of determining a wireless resource from which scheduling is started for each user using at least one of QoS of the user and usable frequency information;

a step of starting scheduling, from a first wireless resource among multiple wireless resources prioritized according to a predetermined criterion, for users for whom a scheduling start wireless resource is the first wireless resource, and a step of repeating scheduling in order up to the last wireless resource for users to whom no resource has been assigned up to previous scheduling and for users for whom a targeted wireless resource in the repetition corresponds to the predetermined scheduling start wireless resource.

According to the present invention, scheduling starts from the first wireless resource among multiple wireless resources prioritized according to a predetermined criteria for all users, and scheduling is repeated in order up to the last wireless resource for users except for users to whom any wireless resource has been assigned. Thus, compared with the conventional scheme in which wireless resource assignment and scheduling are performed in two stages, wireless resource assignment that follows channel states and interference amount and that has high scheduling efficiency can be realized.

BRIEF DESCRIPTION OF THE DRAWINGS

Other objects, features and advantages of the present invention will become more apparent from the following detailed description when read in conjunction with the accompanying drawings, in which:

FIG. 10 shows parameters used in the simulation;

DETAILED DESCRIPTION OF THE PREFERRED EMBODIMENTS

In the following, preferred embodiments of the present invention are described. In the following description, the "wireless resource" is defined as a wireless frequency resource that can be physically divided such as a wireless channel or a wireless frequency or the like. In addition, it is assumed that multiple wireless resources exist in the same base station, and each user can use only one wireless resource at the same time.

Figure 1:
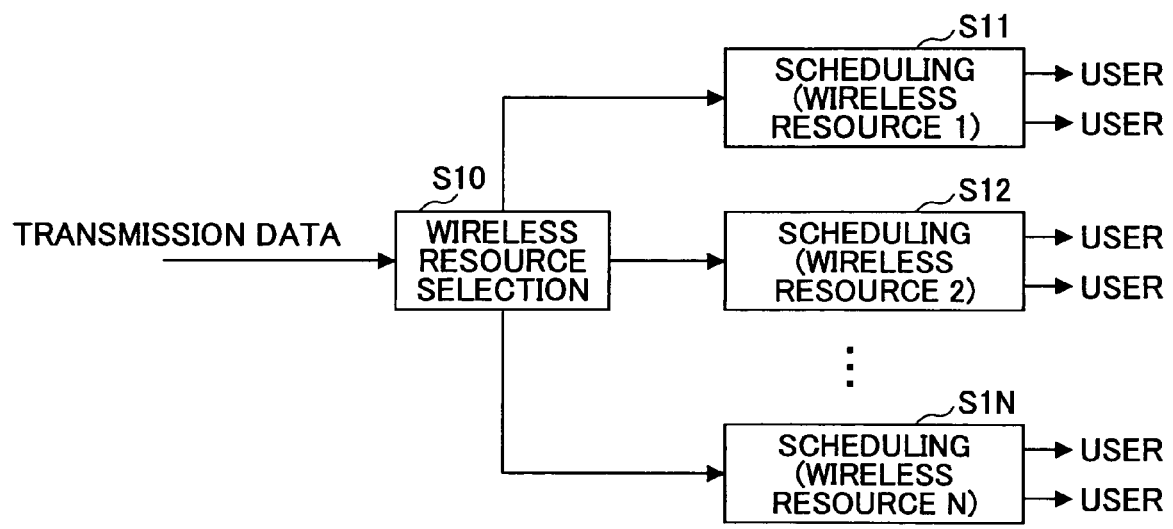
FIG. 1 shows a conventional method for assigning wireless resources.
Figure 2:
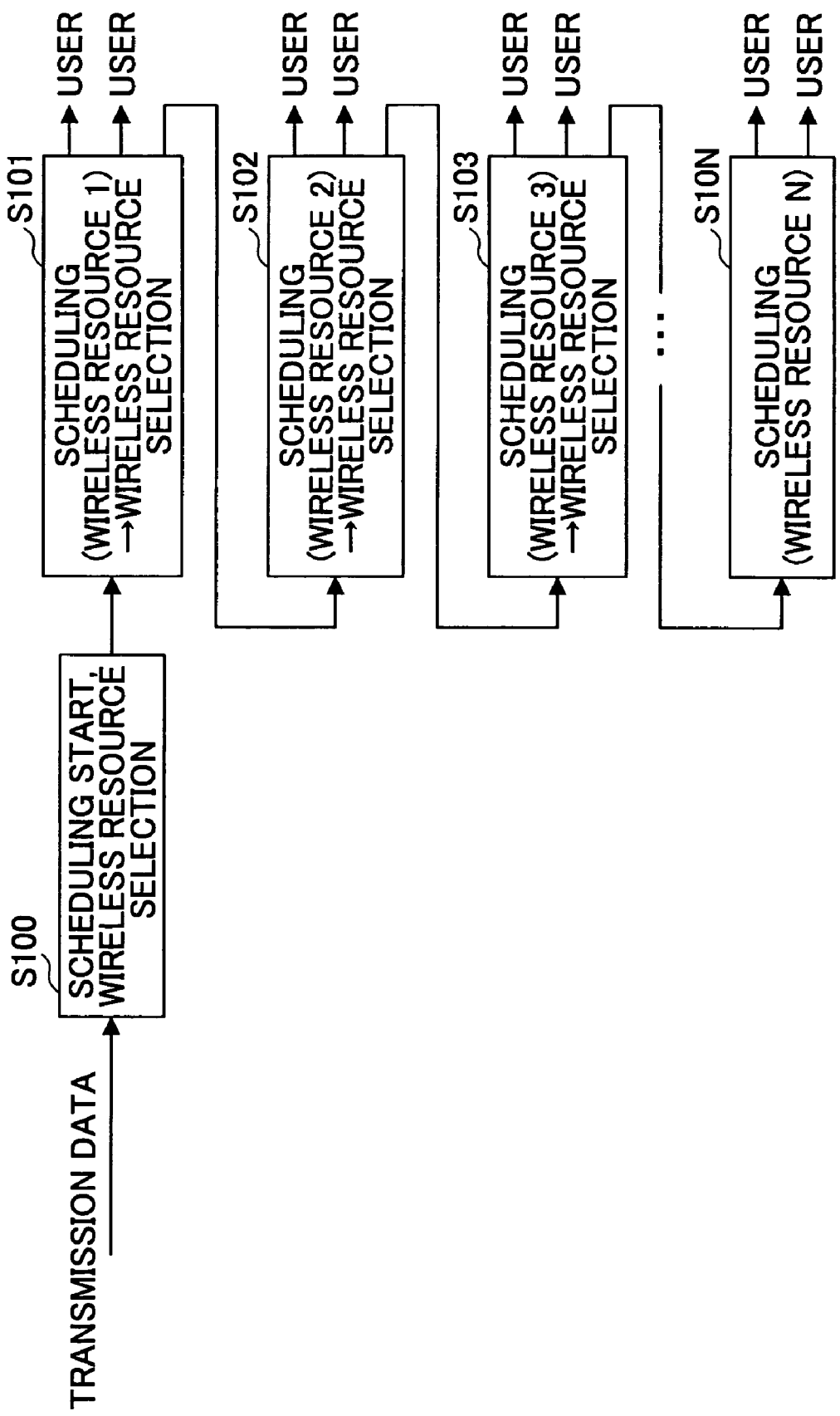
FIG. 2 shows a wireless resource assigning method in a first embodiment of the present invention.

FIG. 2 shows a wireless resource assigning method in a first embodiment of the present invention. In FIG. 2, first, scheduling for transmission data is performed for a wireless resource 1 for each user in steps S100 and S101. The scheduling at the time may be performed using a conventional scheduling algorithm such as the Max. CIR method and the like. A user to whom a wireless resource is assigned by the scheduling uses the wireless resource.

On the other hand, for users to whom the wireless resource is not assigned, scheduling is performed for a wireless resource 2 in the same way for the wireless resource 1 in step S102. At the time, the scheduling criterion may be different from one used for the wireless resource 1. Then, for users to which the wireless resource is not assigned, similar operation is performed for a wireless resource 3 in step S103. By repeating this operation up to the last wireless resource N (step S10N), wireless resource assignment and scheduling are simultaneously performed.

Figure 3:
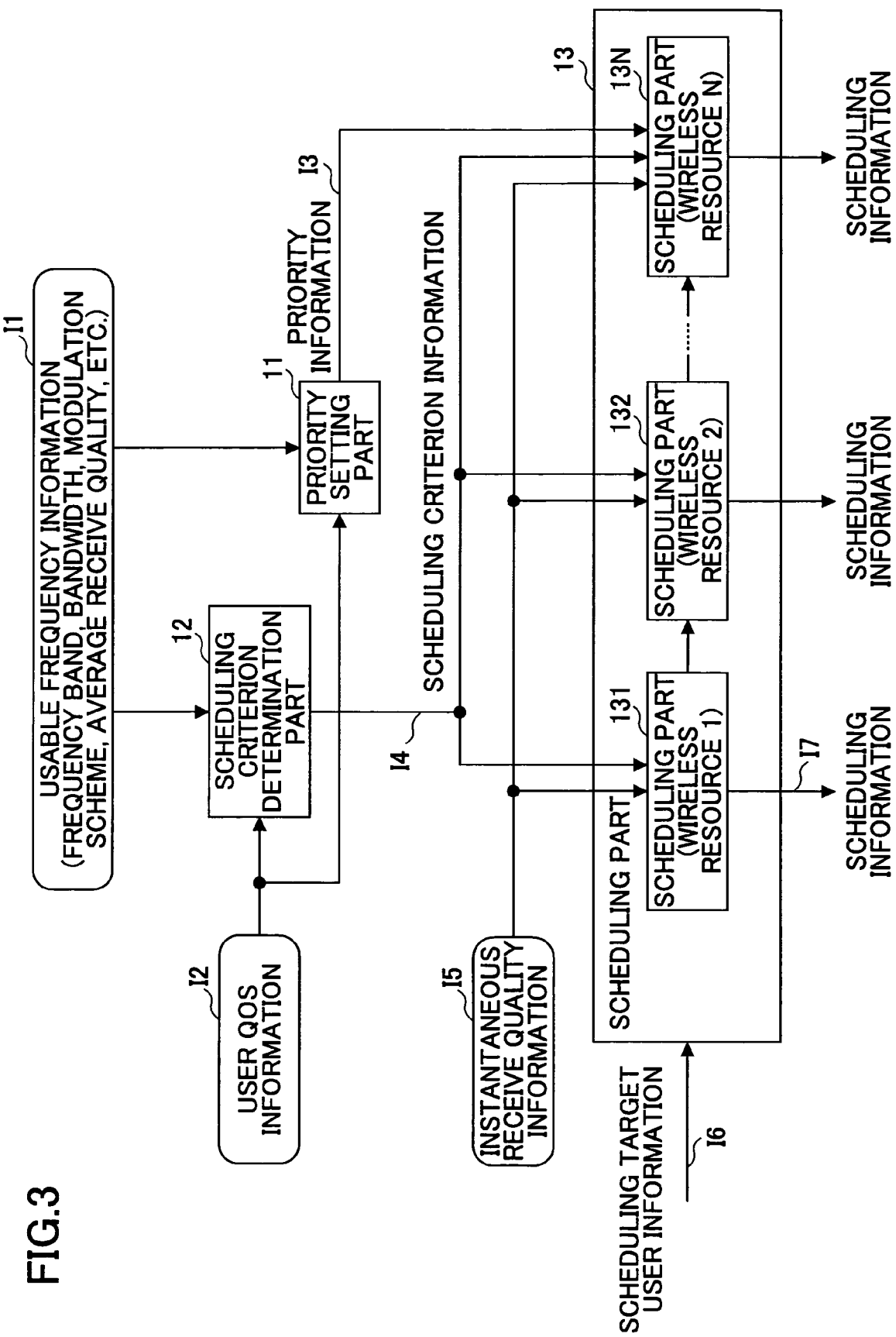
FIG. 3 is a control block diagram of a wireless resource assigning apparatus in the first embodiment.

FIG. 3 is a control block diagram of a wireless resource assigning apparatus in the first embodiment. Each scheduling part (131-13N) corresponding to one of wireless resources 1-N in a scheduling part 13 receives scheduling criterion information I4 supplied from a scheduling criterion determination part 12, instantaneous received quality information I5 obtained by measuring received quality of each user, and scheduling target user information I6 (all users for the wireless resource 1), so that scheduling is performed for target users.

The scheduling criterion determination part 12 determines the scheduling criterion in consideration of user QoS (Quality of Service) information I2 and usable frequency information I1 (frequency band, bandwidth, modulation scheme, average receive quality in base stations and mobile stations, and the like, for example). For example, a method using the Max. CIR method and the like can be considered for improving the system throughput. In addition, a method for setting a threshold for a value of SINR in order to consider user's QoS, a method for limiting the number of users or the like can be adopted. In addition, a criterion for checking whether throughput for each user to whom a wireless resource is assigned satisfies a required QoS can be set.

A priority setting part 11 determines priorities of wireless resources based on the user QoS information I2 and the usable frequency information I1 so as to number the wireless resources in order of the determined priorities. For example, a wireless resource having wide bandwidth may be numbered priority 1. In this embodiment, the wireless resources are assigned in the order of descending priorities determined by the priority setting part 11.

Figure 4:
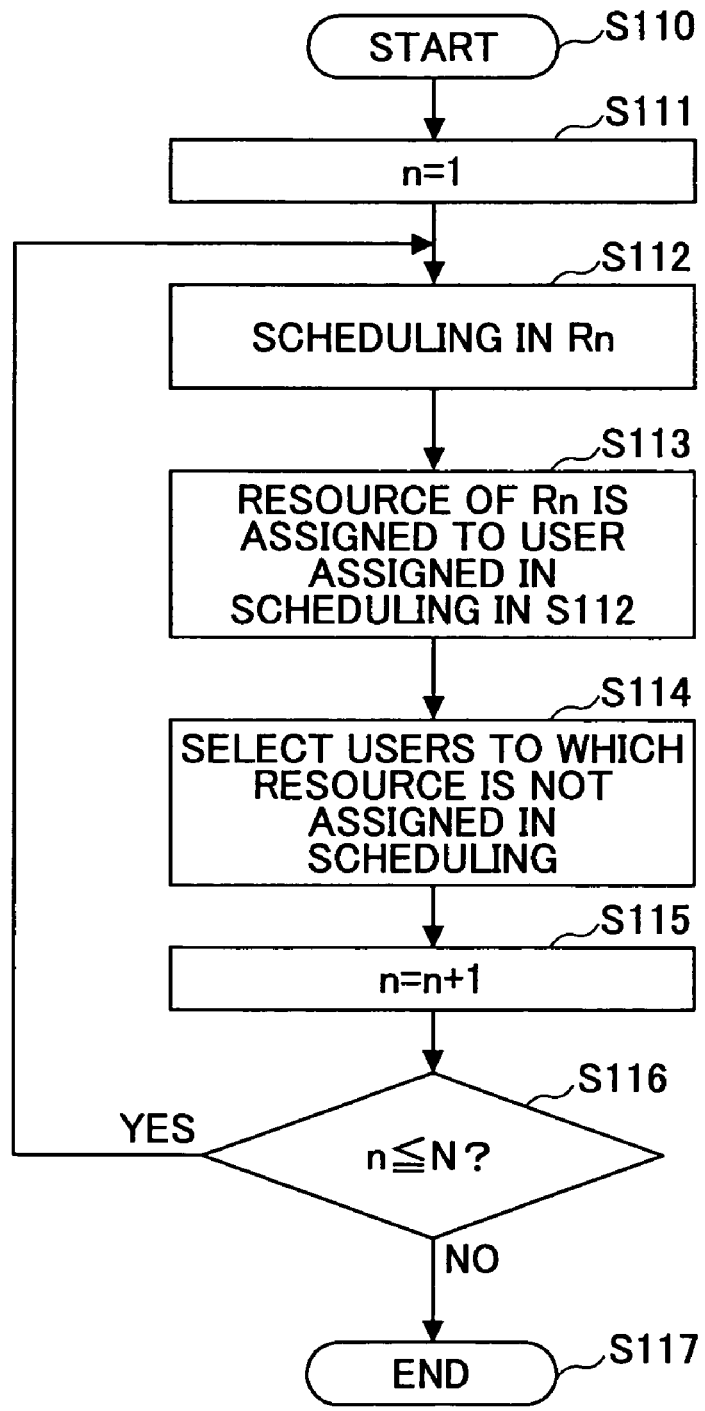
FIG. 4 is a flowchart showing wireless resource assigning processing in the first embodiment.

FIG. 4 is a flowchart showing wireless resource assignment processing in the first embodiment. In the figure, N indicates a number of wireless resources, and Rn indicates a n-th wireless resource. When the processing starts in step S110, 1 is set to n in step S111, and scheduling is performed for R1, that is, a wireless resource 1 in step S112. Then, the wireless resource 1 is assigned to a user assigned in this scheduling in step S113. Next, users to whom wireless resource are not assigned in the scheduling in step S112 are selected in step S114, and n is incremented by 1 in step S115. It is determined whether n is equal to or less than N in step S116. When n is equal to or less than N, the scheduling for a wireless resource Rn is performed (step S112). Then, when n exceeds N, the processing ends in step S117. That is, scheduling is performed starting from the wireless resource 1 of priority 1 in order, and scheduling is performed for a next wireless resource for unassigned users.

Figure 5:
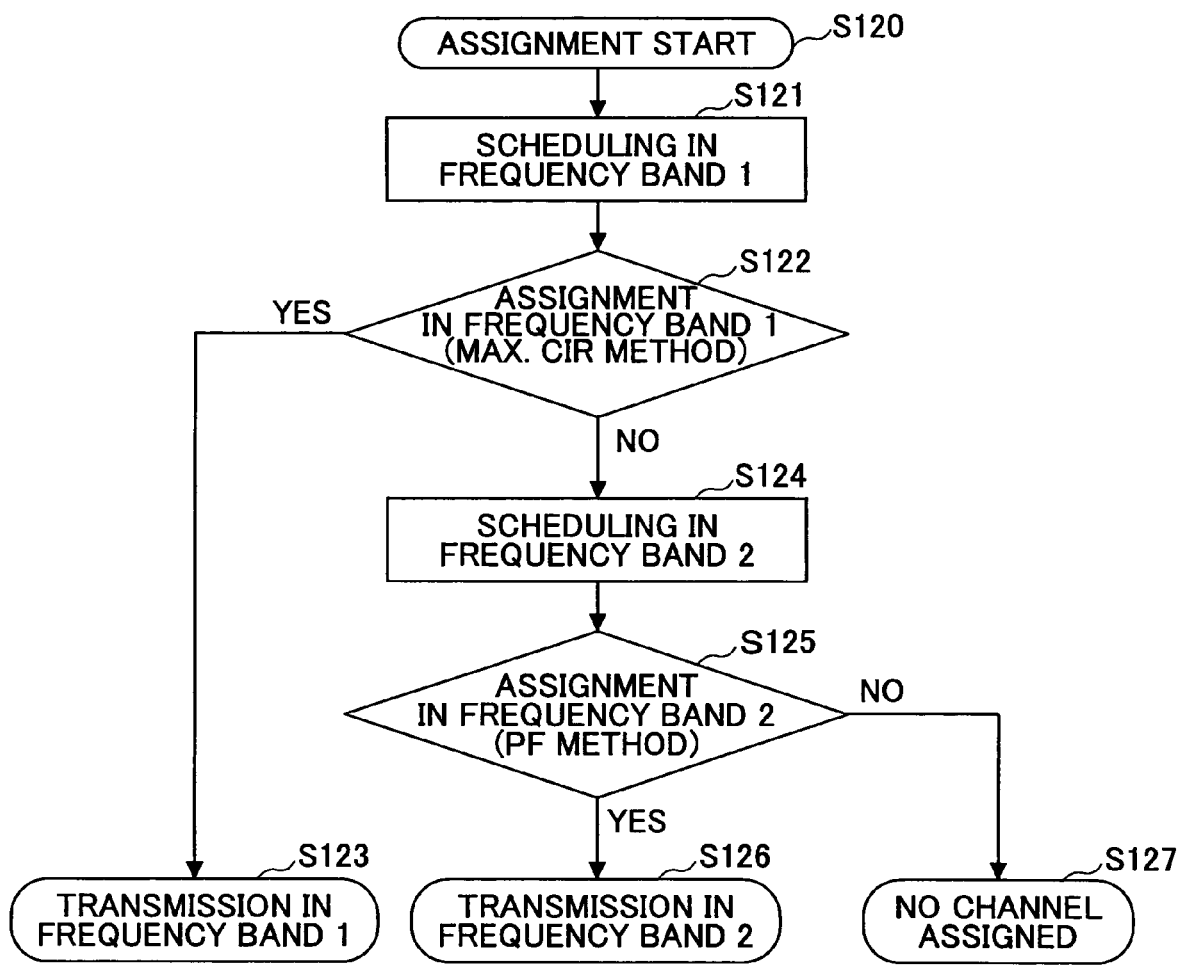
FIG. 5 is a flowchart showing a concrete example of wireless resource assigning processing when two frequency bands are assumed to be the wireless resources.

FIG. 5 is a flowchart showing a concrete example of wireless resource assignment processing when two frequency bands are assumed to be the wireless resources. It is assumed that relationship between frequency f1 of the frequency band 1 and frequency f2 of the frequency band 2 is f1>f2. In FIG. 5, when processing starts in step S120, scheduling based on the Max. CIR method is performed for the higher frequency band 1 in order to enhance frequency efficiency in step S121. A user assigned in this scheduling performs transmission using the frequency band 1 in steps S122 and S123. Next, for users to whom the frequency band 1 is not assigned, scheduling is performed using the PF method in the lower frequency band 2 since it is necessary to keep fairness in step S124. A user to whom the frequency band 2 is assigned in this scheduling performs transmission using the frequency band 2 in steps S125 and S126. Any channel is not assigned to users to whom any of the frequency bands is not assigned in step S127. By doing such control, the system throughput characteristic can be enhanced while keeping fairness.

Figure 6:
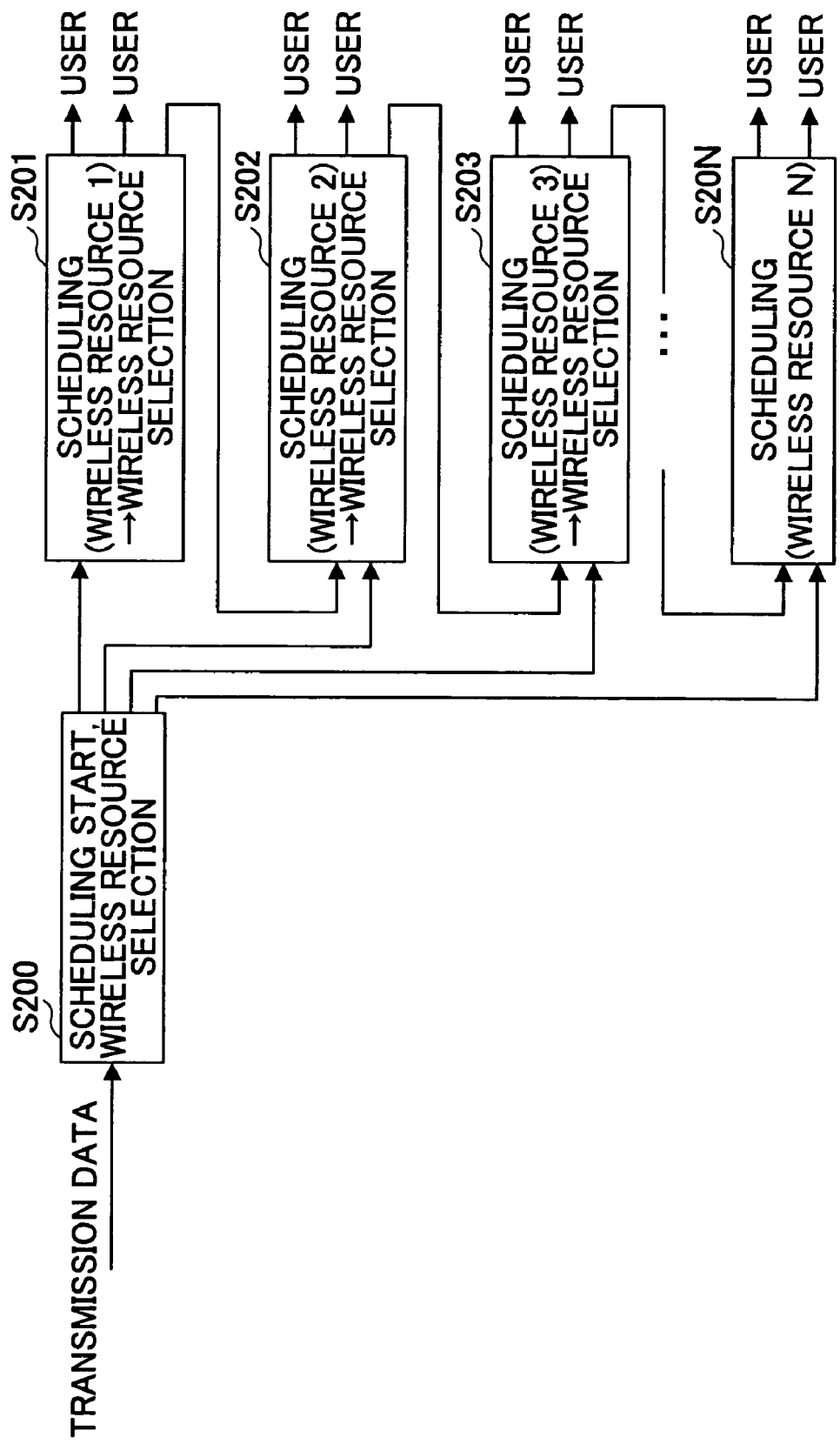
FIG. 6 shows a wireless resource assigning method in a second embodiment of the present invention.

FIG. 6 shows a wireless resource assigning method in a second embodiment of the present invention. In the first embodiment shown in FIG. 2, scheduling is performed from the wireless resource 1 for every user. On the other hand, in this second embodiment, a scheduling start wireless resource from which scheduling starts is set for each user considering characteristics (when bandwidth or frequency is different, characteristics may be difference of frequency) of each wireless resource and considering QoS of each user in step S200. Then, scheduling starts from the wireless resource 1. For the wireless resource 1, scheduling is performed only for users for whom the scheduling start wireless resource is the wireless resource 1 in step S201. In the wireless resource 2, scheduling is performed for uses to whom the wireless resource 1 is not assigned in the previous scheduling and users for whom the scheduling start wireless resource is the wireless resource 2 in step S202. In the same way, scheduling is performed up to the last wireless resource N in step 20N.

According to characteristics of the wireless resource and QoS of users, scheduling can be performed by skipping over an intermediate wireless resource. For example, scheduling for the wireless resource 3 may be performed next to the wireless resource 1.

Figure 7:
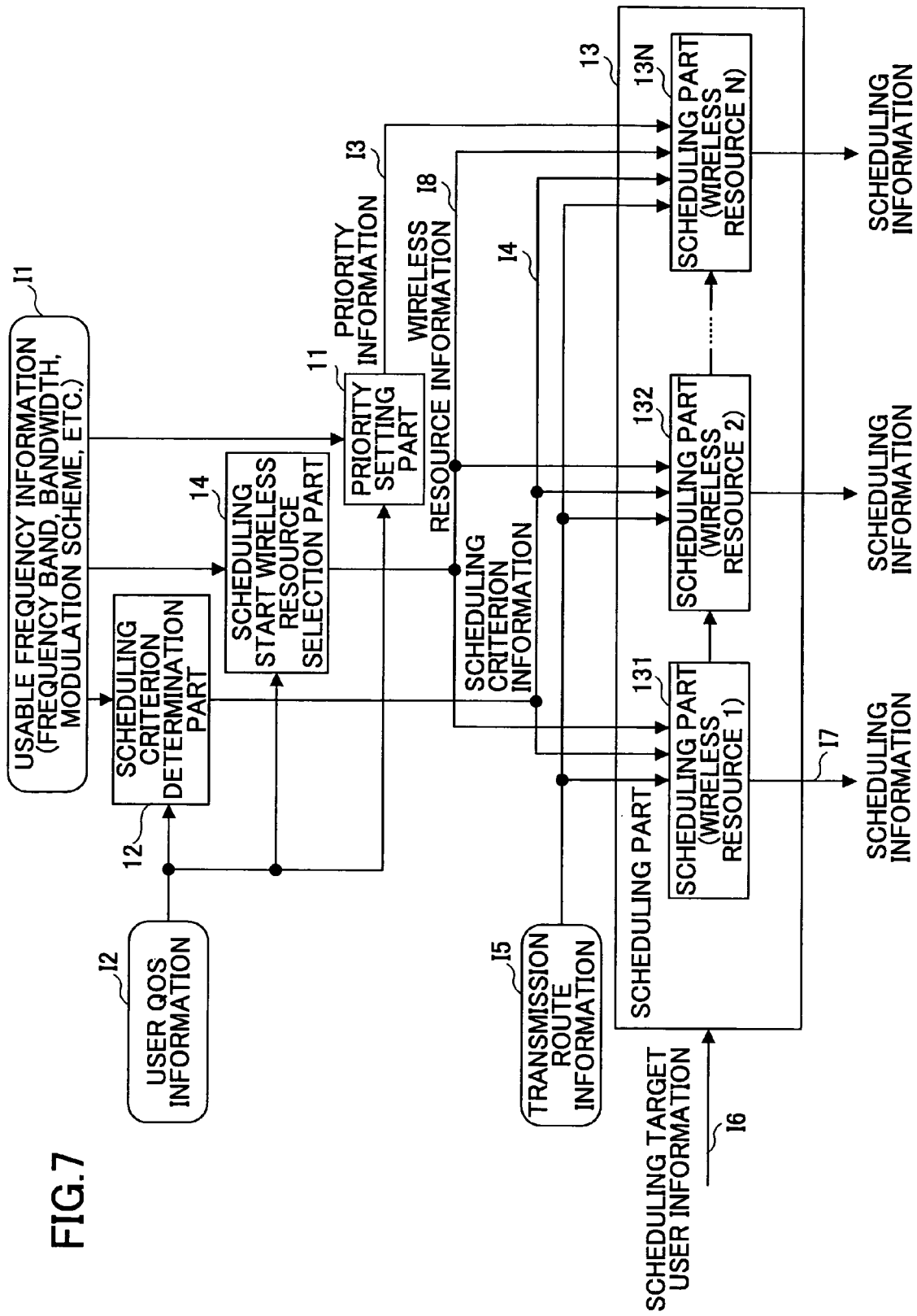
FIG. 7 is a control block diagram of the wireless resource assigning apparatus in the second embodiment.

FIG. 7 is a control block diagram of the wireless resource assigning apparatus in the second embodiment. As shown in the figure, a scheduling start wireless resource selection part 14 is added to the control block in the first embodiment shown in FIG. 3. In the wireless resource assigning apparatus of the second embodiment, the scheduling start wireless resource selection part 14 generates wireless resource information I8 based on the usable frequency band information I1 and the user QoS information I2, in which the wireless resource information I8 include information of wireless resource from which each user starts scheduling. Then, the scheduling start wireless resource selection part 14 supplies the wireless resource information I8 to the scheduling part 13 so as to control scheduling start positions for each user.

Figure 8:
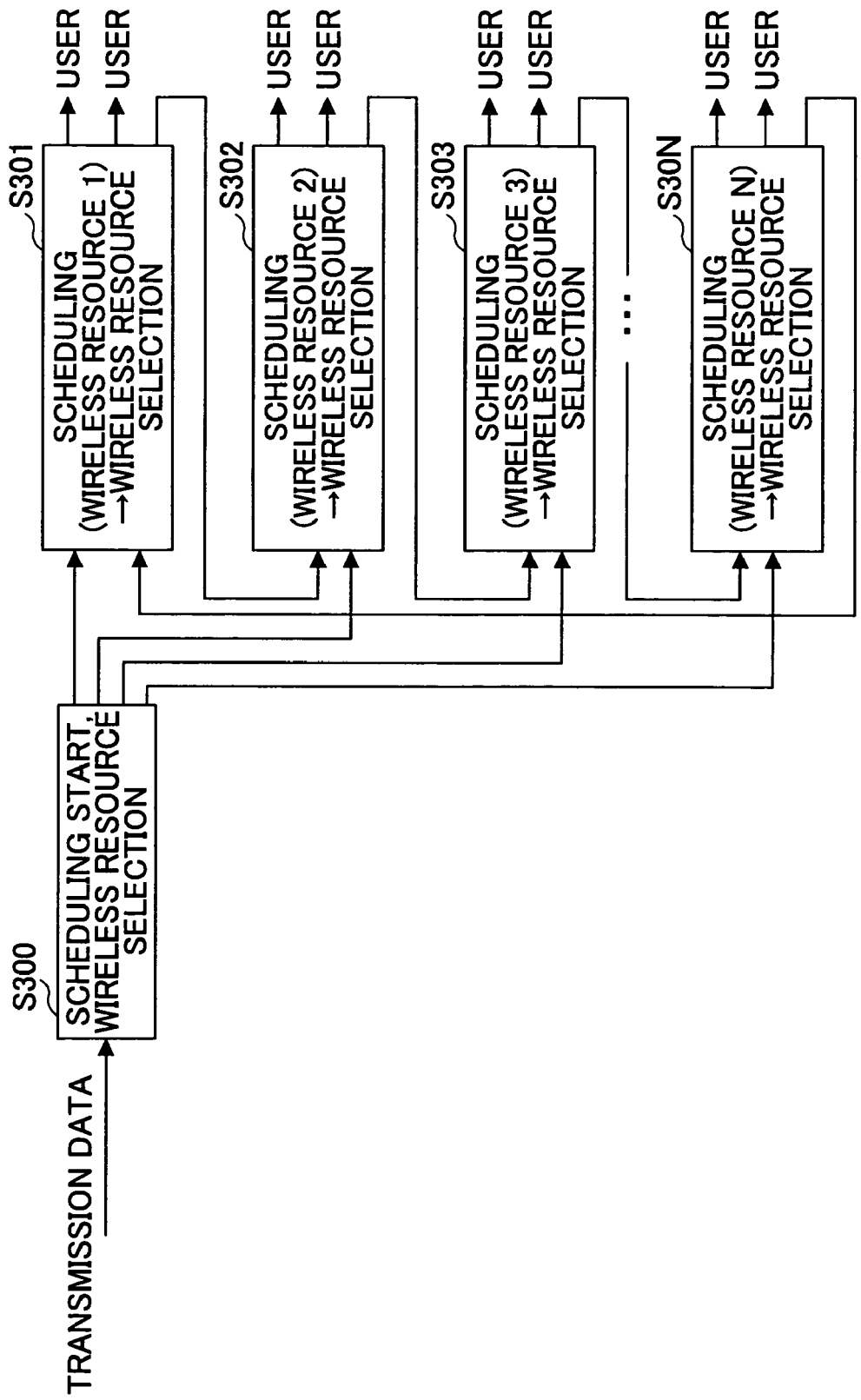
FIG. 8 shows a wireless resource assigning method of a third embodiment of the present invention.

Next, FIG. 8 shows a wireless resource assigning method of a third embodiment of the present invention. In the second embodiment shown in FIG. 6, scheduling processing ends when scheduling for the last wireless resource N ends. On the other hand, in the third embodiment, after the scheduling of the wireless resource N is performed in step S30N, scheduling is performed again starting from the wireless resource 1 for each wireless resource that remains to be an available resource for unassigned users (step S301-). The merit of this method is that wireless resources can be used efficiently when at least a user to whom any wireless resource is not assigned in the scheduling up to the wireless resource N exists and at least an available wireless resource exists in any wireless resource. As to this case for the users to whom any wireless resource is not assigned in the scheduling up to the wireless resource N and scheduling is again performed from the wireless resource 1, the scheduling ends when any wireless resource is not assigned in scheduling up to a wireless resource just before the scheduling start wireless resource of the user, or when any wireless resource is not assigned in the second scheduling up to the wireless resource N.

Figure 9:
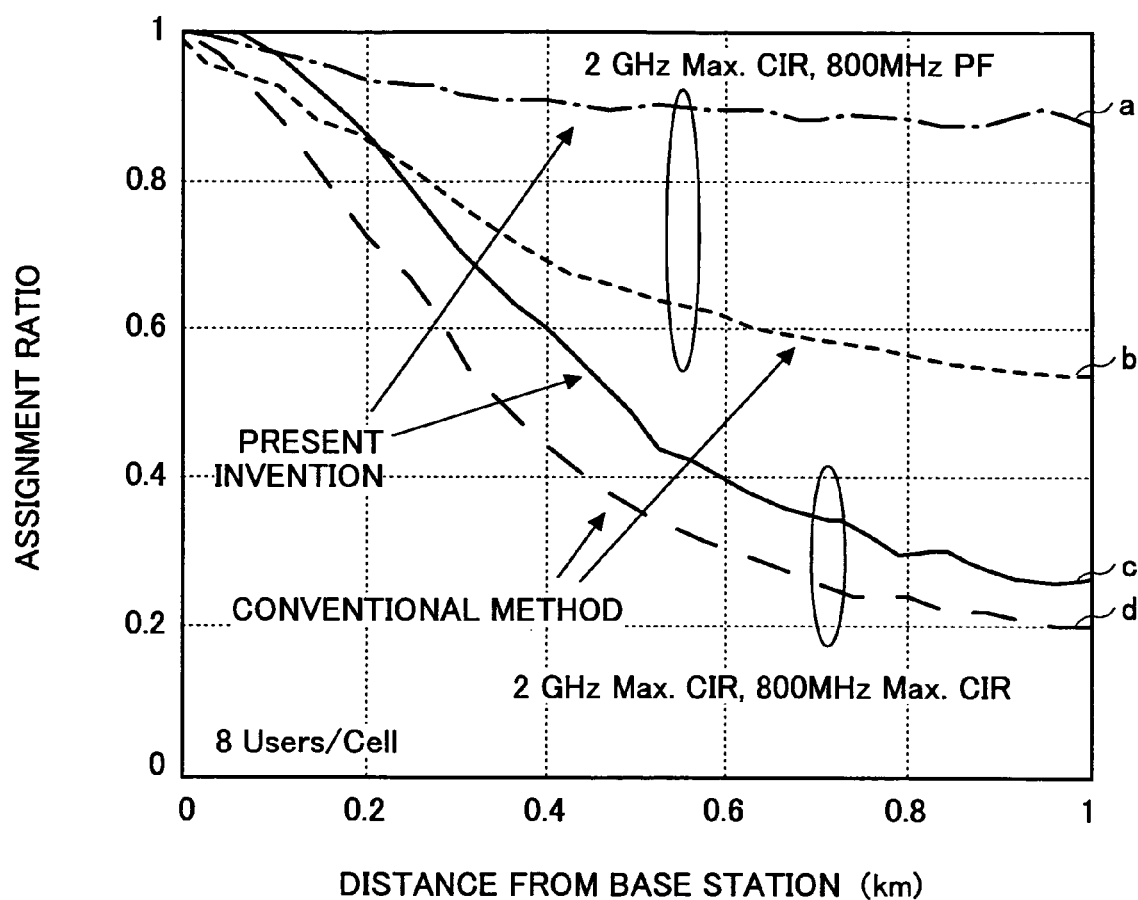
FIG. 9 is a simulation result showing relationship between the distance from the base station and the assignment ratio.

FIG. 9 is a simulation result showing relationship between the distance from the base station to the mobile station and the assignment ratio in this embodiment of the present invention. The lateral axis indicates the distance (Km) between the user and the base station, and the vertical axis indicates the assignment ratio that is a ratio of users to which the resource is assigned. FIG. 10 shows simulation parameters. Namely, a characteristic curve "a" shown in FIG. 9 as the present invention corresponds to a case in which the Max. CIR method is used for 2 GHz band and the PF method is used for 800 MHz band. A characteristic curve "c" shown in FIG. 9 as the present invention corresponds to a case in which the Max. CIR method is used for 2 GHz band and also the Max. CIR method is used for 800 MHz band. As methods to be compared with the present invention, characteristic curves "b" and "d" are shown in which users are assigned at random to one of the frequency bands and scheduling is performed in the assigned frequency band under the same condition.

As clearly shown in FIG. 9, in spite of the difference of the scheduling scheme in the 800 MHz band, it can be understood that the assignment ratio characteristic improves. Especially in the scheme in which the PF method is used for the 800 MHz band, since the PF method is performed for all users to whom resources are not assigned in the 2 GHz band, fairness can be kept.

Figure 11:
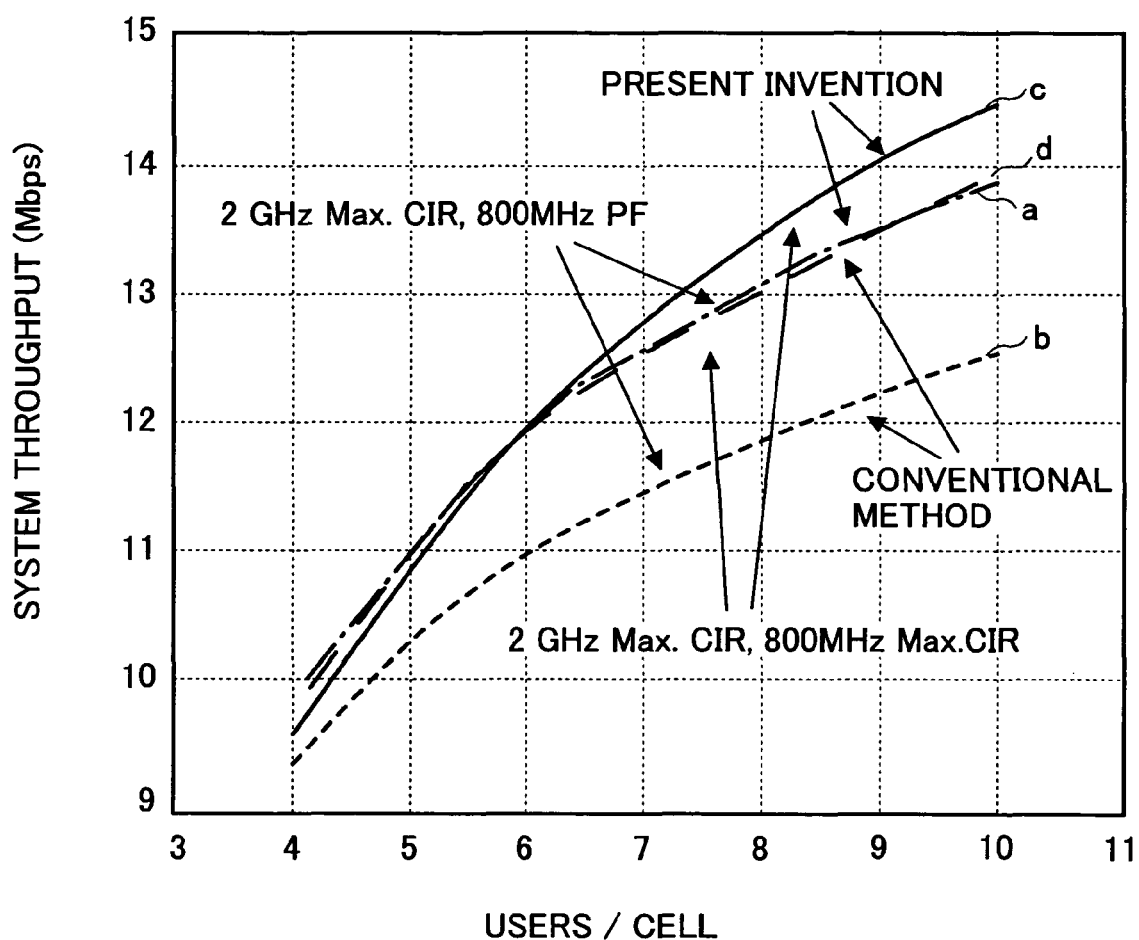
FIG. 11 shows a simulation result showing relationship between the number of users per a cell and system throughput.

FIG. 11 is a simulation result showing relationship between the number of users per a cell and system throughput. The characteristic curves "a"-"d" correspond to the characteristic curves "a"-"d" in FIG. 9 respectively. As clearly shown in FIG. 11, in spite of scheduling criterion of the 800 MHz band, the throughput characteristic improves. The reason is that, since scheduling can be performed for all users in the scheduling for the 2 GHz band, utilization efficiency is increased. According to these results, it can be understood that the method to use the PF method in the 800 MHz band after using the Max. CIR method in the 2 GHz band is the best. The reason is that, the effect of scheduling improves compared with the conventional scheme due to improvement of frequency use efficiency by the Max CIR method and improvement of fairness by the PF method.

As mentioned above, in the present invention, when performing resource assignment across multiple wireless resources (frequency bands, wireless channels and the like, for example), scheduling is performed in the order of descending priorities of the wireless resources. Then, a user assigned in a scheduling uses the wireless resource corresponding to the scheduling, and scheduling is performed with respect to a wireless resource of a next priority for users to whom no resource has been assigned, and this operation is repeated up to the last resource. Therefore, wireless resource assignment that follows channel states and interference amount of each user can be available, so that efficient use of the wireless resources can be realized by controlling scheduling according to wireless parameters (frequency bands, bandwidths and the like) and QoS (type of traffic, required transmission rate) of users.

The present invention is not limited to the specifically disclosed embodiments, and variations and modifications may be made without departing from the scope of the present invention.

The present application contains subject matter related to Japanese patent application No. 2005-049415, filed in the JPO on Feb. 24, 2005, the entire contents of which are incorporated herein by reference.

What is claimed is:

1. A wireless resource assigning apparatus for assigning wireless resources to transmission data of users, comprising:
   a scheduling start wireless resource selection part configured to determine a wireless resource from which packet scheduling is started for each user using at least one of the criteria such as QoS of the user, usable frequency information, and instantaneous receive quality information;
   a scheduling part configured to start packet scheduling for all users using a same packet scheduling criterion, from a first wireless resource among multiple wireless resources prioritized according to a predetermined criterion, and repeat scheduling in order up to the last wireless resource for users except for users to whom a wireless resource has been assigned, wherein, if a user is not assigned an n-th wireless resource in packet scheduling at the n-th wireless resource in the multiple wireless resources prioritized according to a bandwidth of each wireless resource, packet scheduling for assigning an (n+1)-th wireless resource in the multiple wireless resources prioritized according to a bandwidth of each wireless resource is performed for the user next.

2. A wireless resource assigning apparatus for assigning wireless resources to transmission data of a plurality of users, comprising:
   a scheduling start wireless resource selection part configured to determine a wireless resource from which packet scheduling is started for each user using at least one of the criteria such as QoS of the user, usable frequency information, and instantaneous receive quality information;
   a scheduling part configured to start packet scheduling, from a first wireless resource among multiple wireless resources prioritized according to a predetermined criterion, for users for whom a scheduling start wireless resource is the first wireless resource, and repeat packet scheduling in order up to the last wireless resource for users to whom no resource has been assigned up to previous scheduling and for users for whom a targeted wireless resource in the repetition corresponds to the predetermined scheduling start wireless resource, wherein, if a user is not assigned an n-th wireless resource in packet scheduling at the n-th wireless resource in the multiple wireless resources prioritized according to a bandwidth of each wireless resource, packet scheduling for assigning an (n+1)-th wireless resource in the multiple wireless resources prioritized according to a bandwidth of each wireless resource is performed for the user next.

3. The wireless resource assigning apparatus as claimed in claim 2, wherein, after the scheduling for the last wireless resource ends, scheduling processing returns to the first wireless resource, and scheduling is repeated for users to whom no resource has been assigned in previous scheduling.

4. The wireless resource assigning apparatus as claimed in any one of claims 1-3, comprising:
   a priority setting part configured to set priorities to the multiple wireless resources so as to number the wireless resources in order of the priorities.

5. The wireless resource assigning apparatus as claimed in claim 4, wherein the priority setting part determines the priorities of the wireless resources adaptively according to wireless parameters and QoS of users.

6. The wireless resource assigning apparatus as claimed in any one of claims 1-3, comprising:
   a scheduling criterion determination part configured to determine a scheduling criterion applied to each wireless resource.

7. The wireless resource assigning apparatus as claimed in claim 6, wherein the scheduling criterion determination part determines the scheduling criterion for each wireless resource adaptively according to wireless parameters and QoS of users.

8. The wireless resource assigning apparatus as claimed in claim 6, wherein the scheduling criterion determination part determines a scheduling scheme for each wireless resource using at least one of the criteria such as user QoS information, usable frequency information, and instantaneous receive quality information.

9. A wireless resource assigning method, implemented by a wireless resource assigning apparatus, for assigning wireless resources to transmission data of users, comprising:
   a step of determining, by a scheduling start wireless resource selection part of the wireless resource assigning apparatus, a wireless resource from which packet scheduling is started for each user using at least one of QoS of the user, usable frequency information, and instantaneous receive quality information;

a step of starting scheduling, by a scheduling part of the wireless resource assigning apparatus, for all users using a same packet scheduling criterion-from a first wireless resource among multiple wireless resources prioritized according to a predetermined criterion; and a step of repeating scheduling in order up to the last wireless resource for users except for users to whom any wireless resource has been assigned, wherein, if a user is not assigned an n-th wireless resource in packet scheduling at the n-th wireless resource in the multiple wireless resources prioritized according to a bandwidth of each wireless resource, packet scheduling for assigning an (n+1)-th wireless resource in the multiple wireless resources prioritized according to a bandwidth of each wireless resource is performed for the user next.

10. A wireless resource assigning method, implemented by a wireless resource assigning apparatus, for assigning wireless resources to transmission data of a plurality of users, comprising:

a step of determining, by a scheduling start wireless resource selection part of the wireless resource assigning apparatus, a wireless resource from which packet scheduling is started for each user using at least one of QoS of the user and usable frequency information;

a step of starting packet scheduling, by a scheduling part of the wireless resource assigning apparatus, from a first wireless resource among multiple wireless resources prioritized according to a predetermined criterion, for users for whom a scheduling start wireless resource is the first wireless resource, and a step of repeating packet scheduling in order up to the last wireless resource for users to whom no resource has been assigned up to previous scheduling and for users for whom a targeted wireless resource in the repetition corresponds to the predetermined scheduling start wireless resource, wherein, if a user is not assigned an n-th wireless resource in packet scheduling at the n-th wireless resource in the multiple wireless resources prioritized according to a bandwidth of each wireless resource, packet scheduling for assigning an (n+1)-th wireless resource in the multiple wireless resources prioritized according to a bandwidth of each wireless resource is performed for the user next.

11. The wireless resource assigning method as claimed in claim 10, wherein, after the scheduling for the last wireless resource ends, scheduling processing returns to the first wireless resource, and scheduling is repeated for users to whom no resource has been assigned in previous scheduling.

* * * * *